Patented Dec. 6, 1949

2,490,178

UNITED STATES PATENT OFFICE 2,490,178

MANUFACTURE OF ARTIFICIAL SPONGES FROM VISCOSE

Henricus Anthonius van der Kroon, Ede, Netherlands, assignor to American Enka Corporation, Enka, N. C., a corporation of Delaware No Drawing. Application July 28, 1947, Serial No. 764,239. In the Netherlands February 4, 1947

10 Claims. (Cl. 18—48)

The present invention relates to a process for the manufacture of artificial sponges, and more particularly to a simplified method of preparing from viscose synthetic sponges that simulate natural sponges to a large degree.

For many years it has been attempted to manufacture artificial sponges that are commercially satisfactory and comparable to the natural sponge. One of the oldest patents in this field is German Patent No. 280,111, dated 1913. This patent describes two methods for manufacturing artificial sponges from viscose. The first method involves the preparation of a dough from a mixture of viscose, cotton, pulverized kitchen salt (NaCl) and coarse-grained kitchen salt. After properly shaping the dough it is introduced into acetic acid until it is entirely saturated and the acid has coagulated and decomposed the viscose. However, this process is entirely impractical, since the resulting sponge is unstable and disintegrates, even though the process is carried out by experienced viscose technicians.

In the second method described in the German patent, cellulose-nitrate is employed, which is dissolved in a normal way, namely, in a volatile organic solvent, for example, a mixture of ether and alcohol. To that mixture camphor, ricinus-oil, hemp fibers, fine and coarse crystals of Glauber's salt, are added, after which the mixture is formed into the desired shape and exposed in cloth supports to the air until the solvent has evaporated and the cellulose ester is stabilized. The salt is then removed by water, thereby resulting in a product having the required porosity. In this second method a solution of acetyl-cellulose in acetone can be substituted for the cellulose-nitrate solution. In either case, however, the process is too expensive, particularly in connection with the evaporation of the organic solvents and the high cost of the cellulose esters.

The second method was impractical from the standpoint of expense, and the first method did not yield a product sufficiently coherent, and this was probably the reason that the industry then attempted to manufacture sponges by mixing viscose with salt crystals and fibers, after which the mixture was heated in molds in order to coagulate the viscose. Since the decomposition effected by the heating did not always proceed to completion, it was completed by a separate operation such as subjecting the coagulated mixture to the action of an acid, after which the salt was removed by means of water. In some instances when it was necessary to complete the decomposition by means of acid, the salt could be removed at the same time.

The molds in which the mixture was coagulated were usually of such dimensions that the mixture had to be divided into pieces of the proper size. This process always incurred the disadvantage of forming sponges which had skin-like structure on those surfaces that had been in contact with the walls of the mold. While the interior of the sponge and the cut faces presented normal pores, the size of which depended on the size of the grain of salt used, the skin on some of the faces was a serious defect, because the permeability of the skin in comparison to that of the porous portions, was very low. Attempts were made to overcome the disadvantage caused by portions of the sponge having a skin-like structure, by roughening the surface by embedding small objects in the sponge which were later removed. It was also attempted to cover the molds with cloth prior to adding the viscose mixture thereto, which cloth was later withdrawn from the sponge after it was removed from the mold. However, none of these efforts met with any success. In consequence of which the artificial sponges were not accepted by the public. Together with the disadvantages mentioned above, the artificial sponges were usually in the shape of parallelepipeds which do not have the appearance of a natural sponge.

In 1930 (Dutch Patent No. 29,307) an artificial sponge was made by preparing a dough of viscose, hemp fibers and sodium sulphate, and dividing the dough into sponge-shaped lumps and adding them to a boiling solution of 25% sodium sulphate, or to a boiling solution of 35% ammonium sulphate, together with the addition of lactic acid, if necessary. After several hours of boiling, the coagulation and decomposition was complete, after which the sponges were washed to remove the salt. For mass production, this washing step was a time consuming operation, especially because of the salt content of the sponge which when brought into cold water, solidified to a hard salt-cake, and it was impossible to squeeze the scouring water out of the sponge. It was not apparent that this process could be modified, because the Dutch patent made the correct remark that it was surprising that the dough-like mixture did not disintegrate in the boiling salt solution.

Therefore, in practicing the present process it was the more surprising that artificial sponges could be prepared by mixing fibers and salt crystals with a viscose solution and introducing this dough-like mixture directly into water at an elevated temperature, and by so doing, effecting a coagulation, decomposition and dissolving out of the salt in one simultaneous operation.

It was certainly unobvious to those skilled in the art that the viscose would not dissolve, and while at this time the reason for this phenomenon has not been determined, it may be attributed to the withdrawal of the alkali from the viscose, or the initial dissolution of the salt. However, it is a fact that the sponge-shaped ball of viscose dough brought into water at an elevated temperature, for example, from 20° to 100° C., the shape of the viscose mass is maintained during the water treatment. The ball of viscose is allowed to remain in the hot water until the coagulation and subsequent decomposition of the xanthate are complete. During this period, all of the salt present substantially completely dissolves. The time required for this operation depends upon the size of the sponge and upon the temperature, for example, at 100° C., several hours are sufficient time for the ball of viscose to remain in the hot water, whereas at 60° C. for the same size ball the treating operation requires about twice as long, and at 20° C. several days are required to complete the treating operation. Therefore, from a commercially practical standpoint it is preferable to carry out the operation with water maintained at a temperature from 80° to 100° C.

When the sponge-shaped ball of viscose-dough is immersed in a water bath for sufficient time to permit the coagulation, decomposition and salt dissolving to be completed a skin formation occurs at the periphery of the ball but only to a limited extent, so that pores are still formed at the surface although they are smaller than those occurring on the interior of the ball. However, the permeability at the surface is sufficient for commercial use of the sponge, and in fact enhances the utility of the sponge for certain purposes where it is of importance that the pores be small, for example, sponges of this type are particularly adaptable for cleaning windows.

If it is desired to impart to the viscose sponge the natural yellow color that is characteristic of a natural sponge, the yellow coloring matter may be added to the mixture of viscose-dough beforehand; or if it is desired to give the sponge some particular color, the required coloring matter may be substituted for the yellow coloring matter. However, sponges dyed with substantive coloring matter may not be light-proof, so that they will fade on exposure in shop windows or in use. When a coloring matter that is light-proof, such as yellow ochre pigment is used in the mixture, the fibers do not absorb the coloring matter so that those on the surface cause the sponge to have an irregular appearance. In that case it is advisable to dye the fibers before mixing, with a dye of the same color, that is alkali-proof and chlorine-proof, naphthol dye being in this category.

The dough-like mass can be given any desired shape such as a round or egg-shaped configuration. This can be done manually, using a rubber glove as a protection or by means of a suitable apparatus. Such a configuration imparts a very natural appearance to the sponge. In the preparation of sponges for cleaning windows, the sponge can be shaped so that one side is caused to be substantially flat and the remainder of the surface is spherical. This is particularly advantageous because the spherical side enables the operator to hold the sponge in an easy manner.

In the present invention wherein it is possible to manufacture the artificial sponges in water as distinguished from a concentrated boiling salt solution, a great many advantages are realized. Due to the fact that during the decomposition many impurities such as colored products and lye are brought into the coagulating liquid, the coagulant must be refreshed from time to time, and in the case of water this is a simple and inexpensive operation, but when a sodium sulphate solution is used it is necessary to refresh with sodium sulphate, which over a period of time requires a very large amount thereof and this can be very expensive. Moreover, as stated above when the coagulation is effected in a salt solution, another lengthy water washing operation is necessary in order to dissolve all of the salt crystals out of the sponge. This is a long and difficult process. In contradistinction to this step, by this invention the washing operation is carried out for the most part simultaneously with the coagulation and decomposition, since all of the salt will dissolve during the heat treatment. At the completion of the coagulation and decomposition, the sponge is substantially free of salt.

If 10 liters of water are used for each kg. of viscose-dough the treated sponge will contain such a small amount of salt after coagulation and decomposition that a simple after-rinsing operation by squeezing once or twice will remove the small amount of salt remaining therein. This small residual amount of salt can be removed in this manner because it is present in the sponge as a solution and not as crystals.

In practicing this invention, the best results can be effected by meeting the following conditions: the alkali-cellulose used in preparing the viscose should be as young as possible; the xanthation should take place with at least 40% of $CS_2$; the alkali content of the viscose should be as low as possible, for example, in the neighborhood of 5.5%; the viscose should be used in as unripened condition as possible so that the ammonium chloride index is always greater than 20; the quantity of salt crystals should not be too large as this has an unfavorable influence on the coherence of the sponge; a preferable ratio of salt to cellulose is 50:1, and the size of the crystals should then be in the range of 2 to 5 mm. All of the foregoing conditions contribute to the physical structure and appearance of the sponge and in particular contribute to the resiliency thereof.

The following example describes in detail one set of precise conditions that produce an excellent commercial artificial sponge.

*Example*

Cellulose was steeped in approximately 18% sodium hydroxide. The resulting alkali-cellulose was shredded in the usual way and thereafter xanthated. 4 kg. of $CS_2$ to 30 kg. of alkali-cellulose was used for the xanthating operation. The resulting xanthate was dissolved in 36 kg. of 6.25% sodium hydroxide thereby forming a viscose having a cellulose content of approximately 8.5%. To 10 kg. of this viscose 42.5 kg. of crystallized Glauber's salt, 0.3 kg. cotton fibers and 0.1 kg. of yellow ochre, were added.

This dough-like mass was thoroughly mixed and formed into balls or lumps of about 1000 gms. and immersed in boiling water. For every 10 kg. of dough 100 liters of water were used. The lumps of dough were allowed to remain in this hot water bath for five hours, whereafter the rough sponges were removed therefrom. These sponges were passed through a squeezing apparatus where the hot liquid was squeezed out of the dough, after which the sponges were allowed to fall into cold water. After one more squeezing operation and re-treatment with fresh water, the sponges were substantially free of salt so that they only required a bleaching and drying operation, provided these operations were desired. Each cold water washing required not more than 100 liters of water.

In general the time required for the reaction in hot water is approximately proportionate to the diameter of the ball of dough, or about proportionate to the cube root of the weight. For each 10 degrees that the water is raised, the speed of reaction doubles.

What is claimed is:

1. In a process for manufacturing artificial sponges from viscose wherein salt crystals and a small amount of fibers are thoroughly mixed with a viscose solution and a dough-like mass is thereafter formed, the steps consisting essentially of dividing the mass into sponge-shaped lumps and adding them directly to a water bath maintained at a temperature in a range of 20° C. to 100° C. whereby the viscose is simultaneously coagulated and decomposed and the salt content is substantially completely dissolved out of the viscose leaving pores at the surfaces of the lumps.

2. A process for the manufacture of viscose sponges which consists essentially of preparing a dough-like mass by adding crystals of Glauber's salt and a small amount of natural cellulose fibers to a viscose solution, after complete mixing thereof, dividing the mass into sponge-shaped lumps and directly immersing them in water maintained at a temperature in a range of 20° C. to 100° C. until the viscose is completely coagulated and decomposed at which time the salt content has been substantially completely dissolved out of the viscose leaving pores at the surfaces of the lumps.

3. A process according to claim 2 wherein coloring matter is added to the viscose mixture and the fibers are dyed the same color with an alkaliproof and chlorine-proof dye prior to mixing.

4. A process according to claim 3 wherein the sponge-shaped lumps are given an egg-shaped configuration.

5. A process according to claim 3 wherein the sponge-shaped lumps are given a round configuration.

6. A process according to claim 3 wherein the sponge-shaped lumps are formed with a flat side.

7. A process for the manufacture of viscose sponges which consists essentially of preparing a dough-like mass by adding crystals of Glauber's salt and a small amount of natural cellulose fibers to a viscose solution, after complete mixing thereof, dividing the mass into sponge-shaped lumps and directly immersing them in water maintained at a temperature in a range of 80° to 100° C. until the viscose is completely coagulated and decomposed at which time the salt content has been substantially completely dissolved out of the viscose leaving pores at the surfaces of the lumps, rinsing the sponges in cold water and drying the same.

8. A process for the manufacture of viscose sponges which comprises preparing a viscose solution having an $NH_4Cl$ index substantially above 20, adding crystals of Glauber's salt to this unripened viscose until a cellulose : salt ratio of 1:50 is reached, adding to this viscose-salt mixture a small amount of cotton fibers, thoroughly mixing this mass until a dough-like consistency is reached, dividing the mass into sponge-like lumps and immersing them in a boiling water bath for several hours whereby the viscose is coagulated, decomposed and the salt content is substantially completely dissolved out of the viscose leaving pores at the surfaces of the lumps.

9. A process as defined in claim 8 which further comprises adding coloring matter to the viscose solution and predyeing the fibers the same color.

10. A process according to claim 9 in which the coloring matter is yellow ochre.

HENRICUS ANTHONIUS VAN DER KROON.

REFERENCES CITED

The following references are of record in the file of this patent:

UNITED STATES PATENTS

| Number | Name | Date |
|---|---|---|
| 1,611,056 | Mostny | Dec. 14, 1926 |
| 2,011,160 | Plepp | Aug. 13, 1935 |
| 2,043,564 | Vautier et al. | June 9, 1936 |

FOREIGN PATENTS

| Number | Country | Date |
|---|---|---|
| 245,049 | Great Britain | Dec. 31, 1925 |
| 357,335 | Italy | Mar. 11, 1938 |